United States Patent [19]

Perschbacher et al.

[11] 3,837,586
[45] Sept. 24, 1974

[54] APPARATUS FOR GRANULATING STRANDS OR BANDS OF MATERIAL, ESPECIALLY SYNTHETIC MATERIALS

[75] Inventors: Otto Perschbacher, Schaafheim; Friedrich Hunke, Grossostheim-Ringheim; Berthold Glaab, Wenighoesbach, all of Germany

[73] Assignee: Automatic Apparate-Machinenbau H. Hench GmbH, Grossostheim, Ostring, Germany

[22] Filed: Dec. 1, 1972

[21] Appl. No.: 311,386

[30] Foreign Application Priority Data
Dec. 6, 1971 Germany............................ 2160466

[52] U.S. Cl................. 241/223, 198/167, 241/227, 271/275
[51] Int. Cl. ....................... B02c 23/02, B02c 18/44
[58] Field of Search........ 241/222, 223, 227; 271/3, 271/51, 275; 83/906, 114; 198/167

[56] References Cited
UNITED STATES PATENTS

| | | | |
|---|---|---|---|
| 2,506,343 | 5/1950 | Casagrande | 83/114 |
| 2,711,130 | 6/1955 | Guettler | 198/167 X |
| 3,272,309 | 9/1966 | Reading | 198/167 X |
| 3,329,424 | 7/1967 | Rabek | 198/167 X |
| 3,408,063 | 10/1968 | Fabrig | 271/3 |
| 3,635,271 | 1/1972 | Markham | 241/222 |
| 3,650,168 | 3/1972 | Ruschmann | 83/906 X |

FOREIGN PATENTS OR APPLICATIONS
828,653   7/1949   Germany ............................ 241/222

OTHER PUBLICATIONS
Hamilton; W. R., "Roll Fuser With Vacuum Tack," in IBM Technical Disclosure Bulletin, Vol. 14, No. 4, p. 1,158, September, 1971.

Primary Examiner—Roy Lake
Assistant Examiner—Howard N. Goldberg
Attorney, Agent, or Firm—Wolfgang G. Fasse

[57] ABSTRACT

The present apparatus for granulating elongated material includes a transport roller, and infeed and output tables arranged to extend substantially tangentially to the transport roller. A conveyor belt is wrapped around the transport roller and extends from one guide or drive roller adjacent the infeed table and another drive or guide roller adjacent the output table. A tool cooperating with the end of the output table away from the transport roller effects the granulation of the elongated material. The region between the infeed table and the belt is generally funnel shaped. The region between the transport roller and the conveyor belt forms a sheet advance region which extends close to the end of the output table. The portion of the apparatus including the conveyor belt and the input table may be rotated to permit ready access to the end of the output table, which may be formed as a replaceable counter knife.

9 Claims, 6 Drawing Figures

APPARATUS FOR GRANULATING STRANDS OR BANDS OF MATERIAL, ESPECIALLY SYNTHETIC MATERIALS

BACKGROUND OF THE INVENTION

The present invention relates to an apparatus for granulating strands or bands of materials, especially synthetic materials such as elastomeric materials, rubber, or the like, wherein the granulating is accomplished by means of a milling cutter preceded by a feed advance mechanism for the material to be granulated. Hereafter the milling cutter will simply be referred to as the tool.

It has been found that in connection with such granulating devices there exist two problems. On the one hand it is necessary to advance the material to be granulated to the tool without any slipping in order to assure the uniformity of the granular material. On the other hand it is necessary to guide the material to be granulated upstream of the tool in such a manner that the material is not compressed, for example by bulging, and that warping of the material is avoided because such compression or warping could result in overloading the tool. Besides, compression or warping of the material to be granulated would also result in a non-uniform granular material.

A known apparatus of this type employs a feed-in device upstream of the tool. The feed-in device comprises two transport rollers pressing against each other. The difficulty in arranging two transport rollers ahead or upstream of the tool as viewed in the direction of feed advance resides in the fact that it is not possible to locate the transport rollers very closely to the tool unless the diameter of the transport rollers is respectively small. However, small diameter transport rollers have the disadvantage that they create rather narrow zones in which pressure is applied to the material to be granulated, whereby the material either tends to slip or it is subjected to deformation in an undesired manner.

OBJECTS OF THE INVENTION

In view of the above, it is the aim of the invention to achieve the following objects singly or in combination:

- to overcome the drawbacks of the prior art, more specifically to positively guide the material to be granulated along its path to the tool whereby the guiding shall be effective as close to the tool as possible and to simultaneously advance the material with sufficient friction to assure the proper feed advance while avoiding deformations of the material;

- to guide the material in such a manner to the tool that the material cannot escape, especially just immediately ahead of the tool;

- to assure a proper guidance and feed advance even if a material is employed which may vary in thickness;

- to arrange the elements relative to each other in such a manner that there is easy access to the cutting station where the tool cooperates with a counter knife;

- to provide an apparatus for granulating elongated materials wherein material to be granulated is cut into strips prior to being granulated; and

- to provide an improved apparatus for the granulating of elongated materials, in which the material is guided firmly from an infeed table by means which substantially do not effect compression of the material, to an output table forming part of a cutting assembly.

SUMMARY OF THE INVENTION

According to the invention the above objects have been achieved in an apparatus of the type described by providing a feed-in device comprising a transport roller, a feed-in table and an output table. The feed-in table leads substantially tangentially toward the transport roller and the output table extends away from the transport roller, also substantially tangentially, whereby a portion of the transport roller surface forms a feed advance range between the feed-in table and the output table. The feed advance range is partially enveloped by an endless conveyor belt. The conveyor belt is guided about two guide or drive rollers, one of which is arranged relative to the feed-in table and the other of which is arranged relative to the output table. The conveyor belt also runs over a guide or idler roller arranged between the drive or guide rollers in such a manner that between the feed-in table or the transport roller and the respective drive roller there is formed a feed-in funnel and that along the output table there is formed a feed advance range which ends closely ahead of the tool positiond at the end of the output table, whereby the output table forms a counter knife for the tool.

This combination of a transport roller and a conveyor belt which partially envelopes the roller, whereby the conveyor belt extends from the feed-in table over the transport roller to the output table all the way close to a point just ahead of the tool, provides a feed advance range which assures a positive feed advance of the material to be granulated as well as a guidance for said material, whereby bulging is prevented as the material moves toward the tool. Consequently the material may be continuously advanced toward the tool without affording a chance for the material to escape, especially just immediately ahead of the tool.

Since the material to be granulated quite frequently varies in its thickness and since normally the material is not to be subjected to too large a pressure during the guiding of the material toward the tool, it is preferred according to the invention to provide the transport roller with a suitable outer layer of elastic material. Such outer layer has such a thickness that the different thicknesses of the material to be granulated may be compensated by the elasticity of said outer layer of the transport roller. This construction of the transport roller makes the latter suitable for handling especially pressure sensitive and plastic materials.

On the one hand the feed-in funnel should not have too steep a curve and on the other hand the feed advance range should end especially close to the tool. To achieve these two features simultaneously it is advantageous that the drive or guide roller which is arranged opposite the output table has a diameter which is smaller than that of the drive or guide roller arranged opposite the infeed table. The larger diameter of the drive roller opposite the infeed table has the advantage that it provides a relatively smoothly or slowly opening infeed funnel while the smaller diameter of the drive roller arranged above the output table makes it possible to extend the positive feed advance range especially close to the tool.

In order to provide good access to the cutting station or rather to the cutting position where the tool cooperates with a counter knife and inspite of extending the positive feed advance range close to the tool, it is preferred that the infeed table together with the conveyor band and its guide rollers are tiltable about an axis extending coaxially to the transport roller. By turning or tilting the infeed table together with the conveyor belt and together with the guide roller means, it is possible to tilt away this structural unit relative to the output table whereby in the tilted away position the tool and the counter knife are freely accessible.

In order to construct the entire apparatus in a space saving manner while simultaneously taking advantage of gravity of the material to be granulated, the output table may be positioned in such a manner that it extends approximately vertically toward the tool arranged beneath the transport roller. In this case, the material to be granulated is supplied to the infeed funnel from the side or from above whereupon the material partially envelopes the outer surface of the transport roller and is supplied substantially in vertical direction to the tool.

The apparatus according to the invention is especially suitable also for granulating material which is provided as a wide band whereby the infeed table is interrupted by two intermeshing knife rollers, the axes of which are arranged perpendicularly relative to the feed-in direction of the material to be granulated. The knife rollers are positioned in such a manner above or below the infeed table that the material band which is supplied thereto is cut into strands arranged alongside each other.

BRIEF FIGURE DESCRIPTION

In order that the invention may be clearly understood, it will now be described by way of example, with reference to the accompanying drawings, wherein.

DETAILED DESCRIPTION OF EXAMPLE EMBODIMENTS

Figure 1:
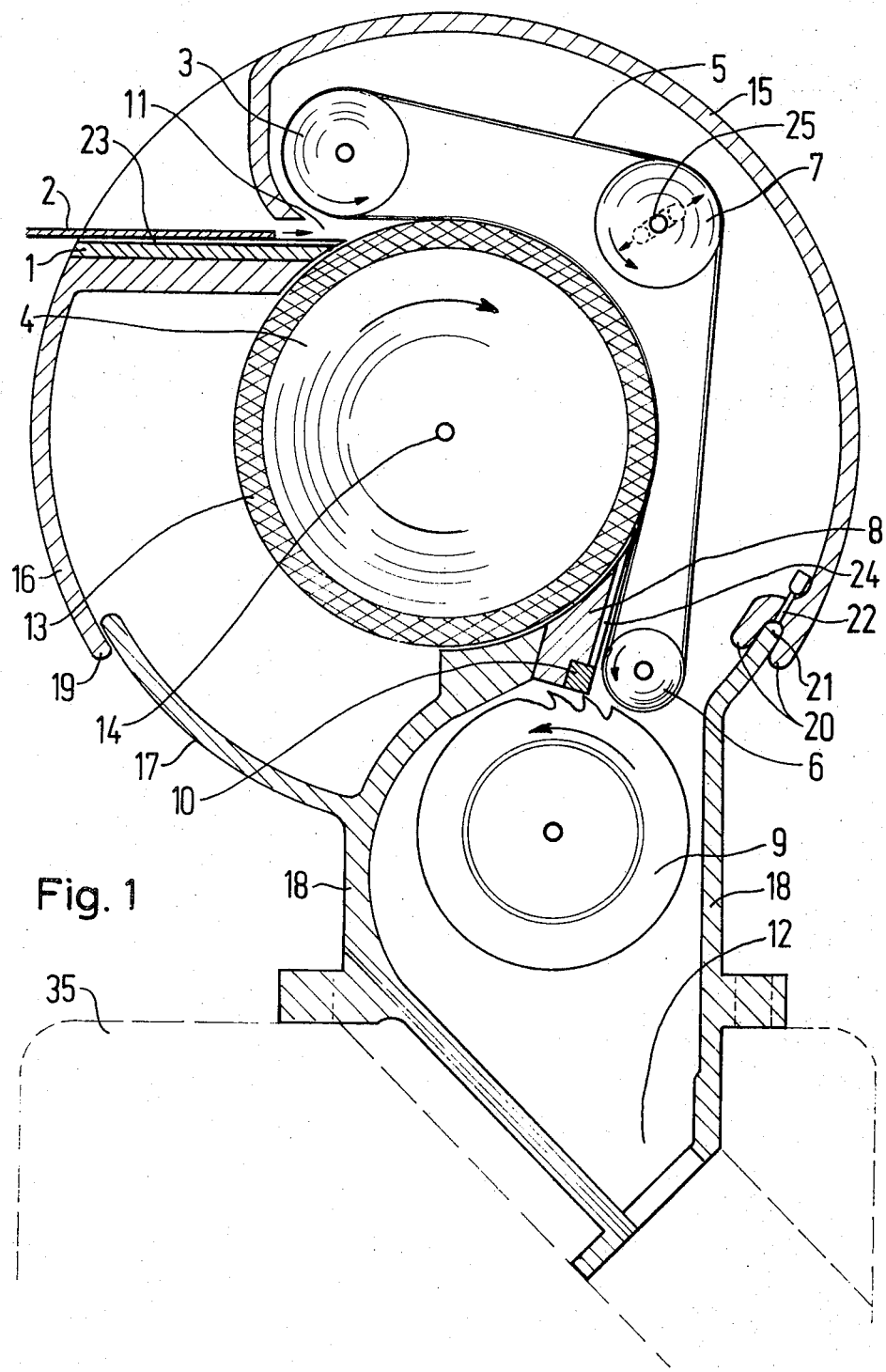
FIG. 1 is a sectional view through the apparatus according to the invention for granulating individual strands, whereby the elements are shown in their working positions.

FIG. 1 illustrates the apparatus according to the invention in a sectional view. The material 2 to be handled is supplied over a horizontally arranged infeed table 1. The material 2 may be in the form of a synthetic strand. As the material 2 continues to advance, it reaches the area between the infeed table 1 and the drive roller 3 where it is grasped by the transport roller 4 as well as by the endless conveyor band 5, whereby the material 2 is entrained by the friction of these elements. The conveyor band 5 is partially wrapped around the transport roller 4 to form a feed advance range therebetween. The conveyor band 5 is then guided to a second drive roller 6 whereupon it returns to the first drive roller 3 due to the guidance by a guide roller 7. In the range between the transport roller 4 and the drive roller 6 the conveyor band 5 runs relative to an output table 8 and forms here a feed advance range which ends just immediately ahead of the tool 9 arranged at the end of the output table 8. The table 8 forms a counter knife for the tool 9. In order to easily exchange the counter knife without undue waste of material, a knife molding 10 is attached to the output table 8 at its end opposite the tool 9. The knife molding or edge 10 may be easily replaced with a sharp one when the knife edge has become dull.

In the above described apparatus the granulating takes place as follows. The material 2 to be handled is supplied to the infeed table 1 and reaches the space between the drive roller 3 and the infeed table 1. This space forms an infeed funnel 11 where the material is positively entrained by the transport roller 4 and the conveyor belt 5 driven in the same direction. The feed advance is positive because the material is clamped between these elements and is thus subject to the friction therebetween. The material 2 is then lifted off the transport roller by means of the output table 8, whereby it continues to be securely guided by the conveyor band 5 running along the output table 8 so that the material reaches the tool 9 without any possibilities for bulging. The tool 9 cuts the material 2 in cooperation with the cutting edge 10 into a granular consistency. The tool 9 rotates in the direction shown by the arrow. The granular material then reaches the output funnel 12 from whence it is directed into suitable containers (not shown).

In order to compensate for possible differences in thickness in the material to be handled, the transport roller 4 is provided with a layer 13 of elastic material which has such a thickness that different material thicknesses of the material 2 can be compensated by the elasticity of the layer 13. The layer 13 may be made of an elastic synthetic material or of rubber or some similar material. The strand of the material 2 may thus extend somewhat into the layer 13 due to said elasticity. This embedding by the way assures an especially good positive feed advance of the material 2.

It is possible by means of the above described apparatus not only to granulate a single strand of material but also a plurality of strands may be granulated if the apparatus has a respective lateral width, whereby a plurality of strands may be advanced alongside each other for the granulating, whereby these strands are advanced in unison and in parallel to each other over the infeed table 1 as described above until they reach the tool 9, whereby the plurality of strands are cut simultaneously into a granular consistency.

The embodiment as shown in FIG. 1 comprises a drive roller 3 having a relatively large diameter as compared to the relatively small diameter of the drive roller 6. Due to the large diameter of the drive roller 3, an infeed funnel 11 is formed which has a rather small slope so that the feed-in of the material 2 cannot be bulged at this point. The relatively small diameter of the drive roller 6 assures that the conveyor band 5 may remain in contact with the material 2 until a point immediately adjacent to and ahead of the tool 9. This arrangement of the conveyor band 5 assures that the positive feed advance range extends to a point closely ahead of the end of the output table 8 or rather ahead of the tool 9 arranged adjacent to the knife edge 10. The smaller the diameter of the drive roller 6 the closer will the positive feed advance range extend toward the tool 9.

Figure 2:
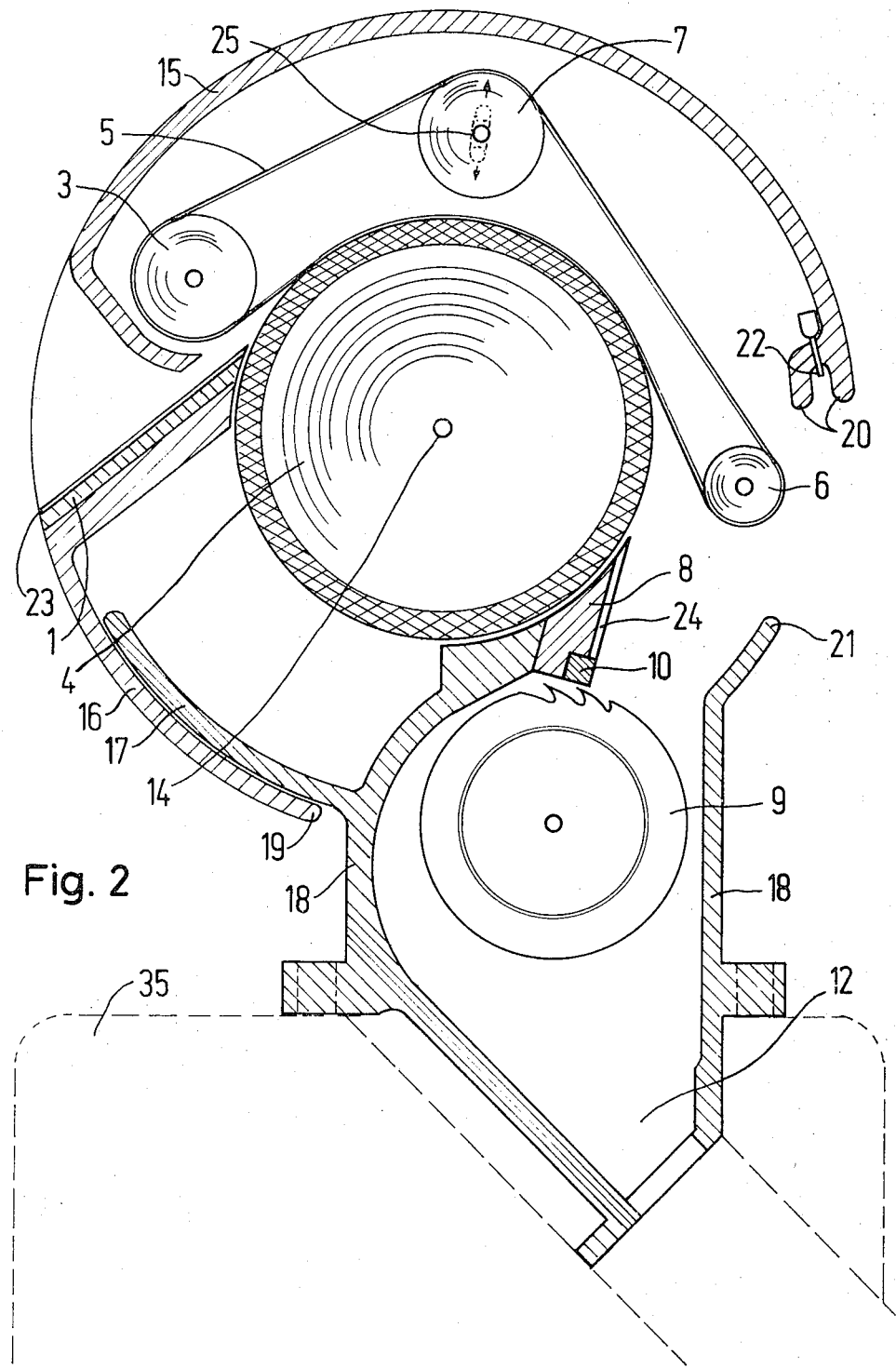
FIG. 2 illustrates the same apparatus as FIG. 1, wherein the conveyor band is tilted away from the cutting position.

In order to make the critical point of the just described apparatus easily accessible, namely the point comprising the cutter 9 and the knife edge 10, in order to examine these elements with regard to their effectiveness, it is desirable that the infeed table 1 and the conveyor band 5 as well as the guide roller means comprising the drive roller 3 and 6 as well as the guide roller 7 be tiltable about the axis 14 which also is the axis of rotation for the transport roller 4. FIG. 2 illustrates the apparatus according to FIG. 1 in a position in which the just mentioned elements forming a structural unit are shown in the tilted position. It will be seen that the drive roller 6 together with the conveyor band 5 are tilted away from the output table 8 so that the cutting point between the tool 9 and the knife edge 10 is open and accessible. In this position of the apparatus, the knife edge 10 may be easily exchanged if necessary. The mounting of the members to achieve this tilting movement are conventional, and hence a detailed description of this feature has been omitted from the drawing for the sake of clarity.

In order to protect the present apparatus against external damaging influences as well as to protect the operating personnel against injuries the entire apparatus is placed in a housing. On the one hand the conveyor band 5 and the two drive rollers 3 and 6 as well as the guide roller 7 are arranged in a housing 15 which is tiltable together with the conveyor band 5. On the other hand the side of the transport roller 4 which faces away from the conveyor band 5 is protected by means of two overlapping walls 16 and 17. The wall 16 extends into the infeed table 1 which extends out of the housing 15. The other wall 17 extends out of the housing 18 of the tool 9. The housing 18 extends downwardly into the output funnel 12. When the housing 15 is tilted from the position shown in FIG. 1 into the position shown in FIG. 2, the wall 16 slides over the wall 17 whereby the front face 19 of the wall 17 forms a stop cooperating with the housing 18 whereby the tilting movement upon opening the apparatus is limited. On the other side the housing 15 ends in a forked receiver 20 which receives a stud 21 of the housing 18 when the apparatus is in its closed position. The stud 21 and the receiver 20 form thus an effective stop in the working position of the apparatus which simultaneously constitutes a closing connection of the housings 15 and 18 and thus the output funnel 12 for the granular material. In order to assure that the apparatus will remain stationary in the open position of the housing a stop switch 22 is attached to the receiver 20. The stop switch 22 is actuated by the studs 21 when the housing is lifted, whereby the drive means of the apparatus are switched off.

The infeed table 1 and the output table 8 are each provided with exchangeable layers 23 and 24 of sheet metal which layers have an especially smooth surface facing the material 2 whereby the feed advance of the material is not impeded.

In order to sufficiently stretch the conveyor band 5 the axis 25 of the guide roller 7 is supported by conventional means to be shiftable. The direction of shifting of the axis 25 is shown by the respective arrows. The more the axis 25 is shifted outwardly the more will the conveyor band 5 be stretched.

In the apparatus illustrated in FIGS. 1 and 2 the feed advance of the material 2 into the input funnel 11 is accomplished in a substantially horizontal direction. However, it is also possible to employ another feed advance direction for example a vertical direction.

Figure 3:
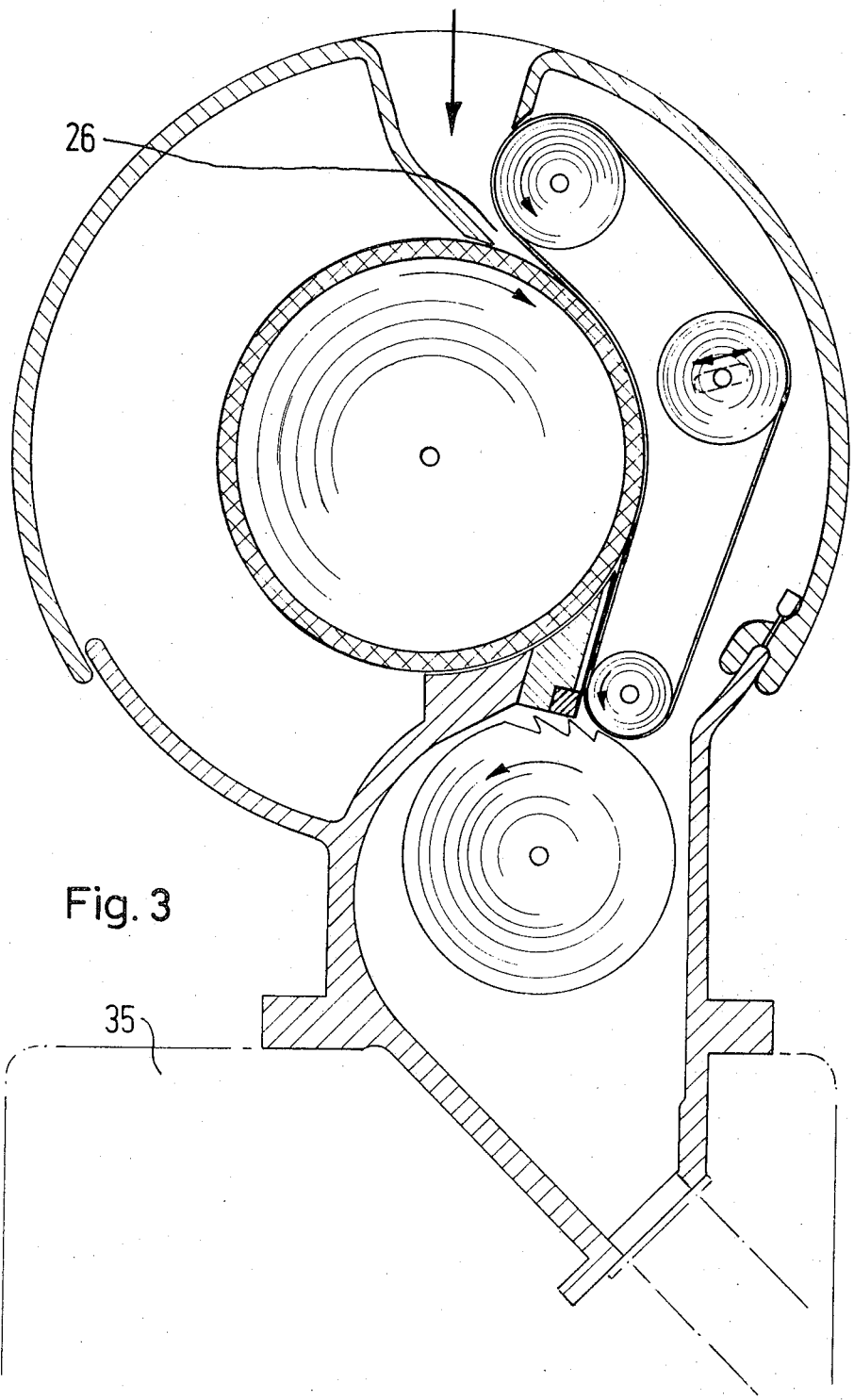
FIG. 3 illustrates in cross section an embodiment similar to that of FIG. 1, in which the infeed of the material to be granulated is accomplished from above.

An embodiment illustrating a vertical feed advance direction is shown in FIG. 3 which embodiment corresponds substantially to that of FIG. 1 except for the vertical feed advance direction and the in-feed funnel 26 which is slightly tilted relative to the vertical direction thus, a detailed description of this figure is not necessary and reference may be had to the description of the respective elements in FIGS. 1 and 2. The apparatus according to FIG. 3 is especially suitable for cooperation with other devices from which the bands to be granulated extend for example in a vertical direction.

Figure 4:
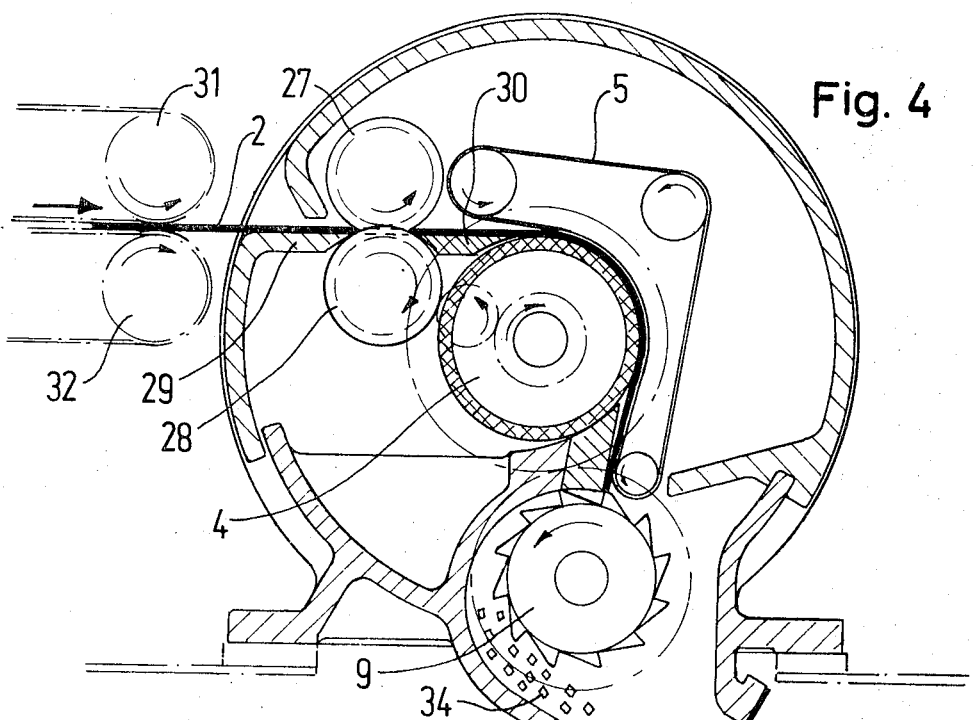
FIG. 4 illustrates an apparatus in cross section comprising knife rollers for cutting a wide band into strands arranged alongside each other, in accordance with a further embodiment of the invention.

The apparatus according to FIG. 4 is suitable for granulating relatively wide bands of material. For this purpose the bands are first cut into individual strands extending alongside each other which strands are then granulated in the manner described above. For cutting the bands into parallel strands there are provided two intermeshing knife rollers 27 and 28 which in this embodiment interrupt the feed-in table so that the feed-in table comprises the members 29 and 30. The axes of the knife rollers 28 and 29 extend perpendicularly to the infeed direction of the material 2. Due to the fact that the knife rollers 27, 28 intermesh with each other in a known manner, they cut the wide band shaped material 2 into strands extending alongside of each other, which are then granulated in the manner described with reference to FIGS. 1 and 2. The elements for this granulating purpose correspond completely to those described and illustrated with reference to FIGS. 1 and 2 so that a further description of these elements is not necessary having regard to the above description of FIGS. 1 and 2. In FIG. 4 two additional feed rollers 31 and 32 are shown in front of the apparatus which are pressed against each other and which assure a uniform feed advance of the material 2 moving between these rollers 31 and 32.

Figure 5:
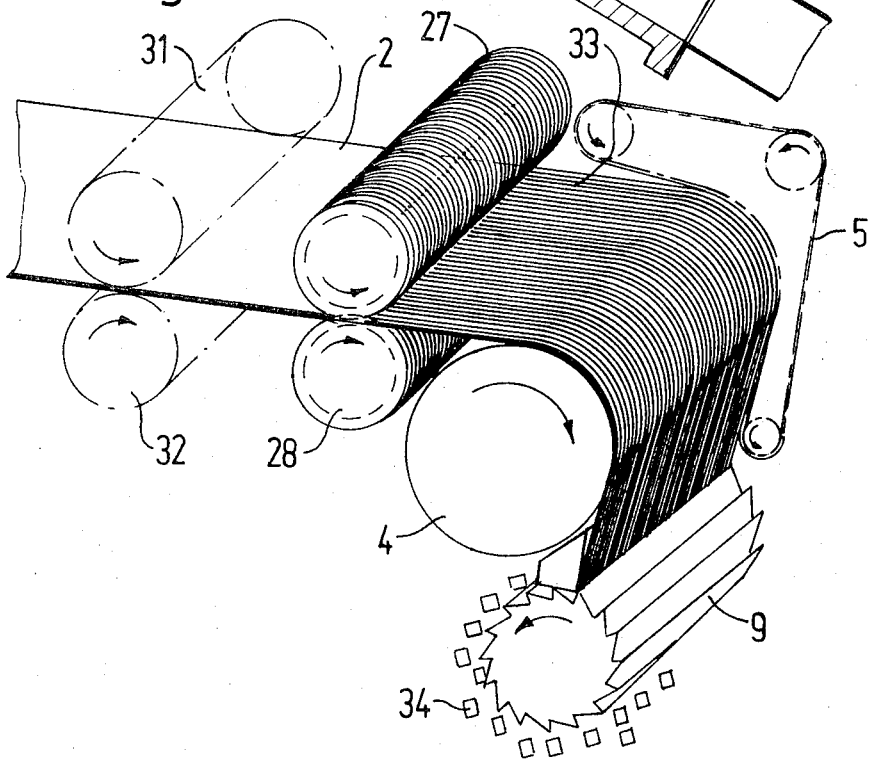
FIG. 5 shows the apparatus according to FIG. 4 in a somewhat schematic and perspective view.

FIG. 5 illustrates the apparatus of FIG. 4 in a perspective view. It will be seen from FIG. 5 how the knife rollers 27 and 28 cut the band shaped material 2 which is supplied to the knife rollers 27 and 28 into a plurality of strands 33 extending alongside each other. These strands 33 are then moved toward the tool 9 by means of the transport roller 4 and the conveyor band 5 whereby the tool 9 granulates the strands 33 into granular material 34. FIG. 5 further shows clearly the positive guiding of the individual strands 33 alongside each other. The same guiding is accomplished by means of the apparatus shown in FIGS. 1 to 3 if a plurality of strands is supplied to this apparatus of FIGS. 1 to 3 instead of a band shaped material. In this instance the material 2 as shown in FIG. 5 would already comprise a plurality of strands extending alongside each other.

Figure 6:
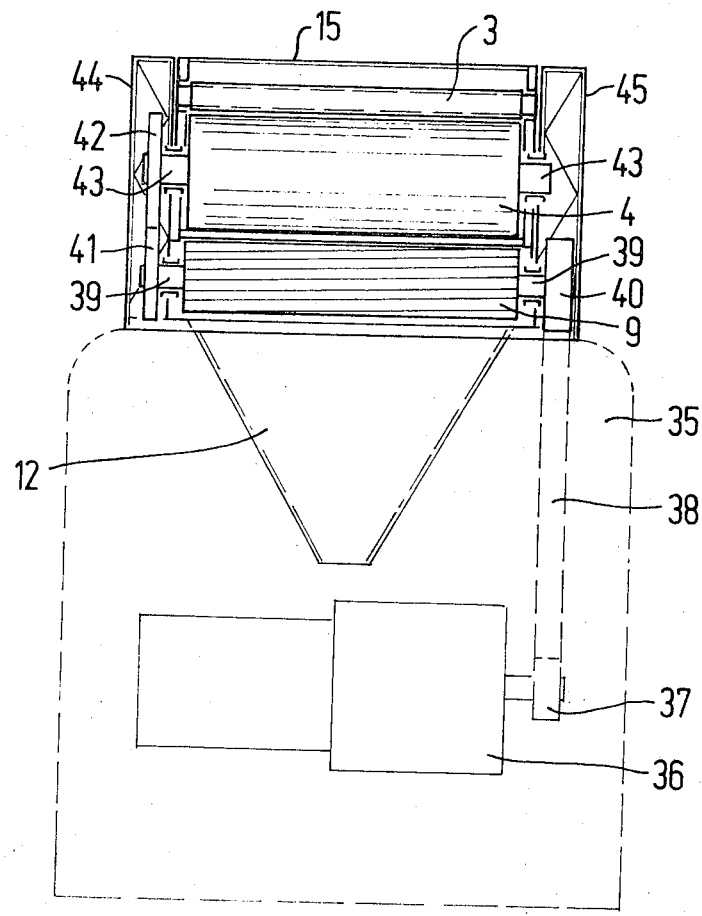
FIG. 6 shows a front view of the apparatus according to FIG. 1 in a somewhat schematic illustration and including a support frame as well as drive means.

FIG. 6 illustrates a front view of the apparatus according to the invention in a somewhat schematic manner. It will be seen that the structural unit comprising the transport roller 4, the drive roller 3, and the tool 9 is supported on the frame structure 35 from which the output funnel 12 extends. A drive motor 36 is arranged in the supporting frame 35. The motor drives the belt pulley 14 arranged on the axle 39 of the tool 9 by means of the belt pulley 37 and the drive belt 38. On the other end of the tool 9 a gear 41 is arranged on the axis 39 which gear 41 meshes with the gear 42 which in turn is arranged on the axis 43 of the transport roller 4, whereby the latter is driven. The drive of the drive roller 4 and of the conveyor band which is not shown in FIG. 6 is accomplished by the friction between the conveyor band and the transport roller 4. The just described drive means for the tool 9 and the transport roller 4 are arranged in respective housings 44 and 45 which are connected to the housing 15 so that these elements are also securely encapsulated and thus do not form any source of injury or danger for the environment.

It should be pointed out here that the means for the transport and for the granulating of the material, that is, the transport roller 4, the conveyor 5, the drive rollers 3 and 6 and the guide roller 7 as well as the tool 9 may be manufactured in the respectively desired width depending upon the width of the material to be granulated or upon the number of strands extending in parallel. These means will then be connected to the same drive means, that is, the belt pulley 14 and the gear wheels 41 and 42 so that the same assembly of structural units may be accomplished.

It should also be mentioned at this point that the tool although described as a cutting tool may have any suitable shape, and its operation need not necessarily be by cutting.

Although the invention has been described with reference to specific example embodiments, it is to be understood, that it is intended to cover all modifications and equivalents within the scope of the appended claims.

We claim:

1. In an apparatus for granulating elongated material including a cutting tool and material feed-in means arranged upstream of said cutting tool between a feed-in point and said cutting tool, as viewed in the direction of feed advance of said material, said feed-in means including at least two rollers and a conveyor belt wrapped around said two rollers, said feed-in means further including a run-off table arranged immediately adjacent to said cutting tool, said run-off table having a downstream end forming a counter edge for said cutting tool, said conveyor belt extending substantially from a feed-in point to said downstream end of said run-off table, the improvement comprising a guide cylinder rotatable about an axis and arranged for cooperation with said conveyor belt, said feed-in means comprising a feed-in table arranged at said feed-in point and extending substantially tangentially relative to said guide cylinder, said run-off table also extending substantially tangentially relative to said guide cylinder, said feed-in table and said run-off table being arranged at an angle relative to each other, one of said two rollers being arranged adjacent to said feed-in table, while the other of said two rollers is arranged adjacent to said downstream end of said run-off table whereby the guide cylinder and the conveyor belt form a guide channel for said material, said feed-in means further comprising at least one guide means for said conveyor belt arranged intermediate said two rollers.

2. The apparatus according to claim 1, wherein said feed-in table, said guide cylinder, said one roller of said two rollers and said conveyor belt form a feed-in funnel.

3. The apparatus of claim 1, comprising a layer of elastic material on the outer surface of said guide cylinder, said layer having such a thickness that variations in thickness of said material to be granulated are compensated by the elasticity of the elastic material layer.

4. The apparatus of claim 1, further comprising a housing member journaled on said guide cylinder axis for tilting said housing member through a predetermined angle, means for rotatably supporting said two rollers in said housing member, wherein said two rollers are tiltable in unison relative to the guide cylinder by tilting said housing member, at least a portion of said feed-in table forming part of said housing member so as to tilt along with the housing member, and stop means for limiting the angular displacement of said housing member.

5. The apparatus of claim 4, further comprising switch means operable to permit operation of said apparatus in only one angular position of said housing member.

6. The apparatus of claim 4, further comprising channel means for receiving granular material cut by said cutting tool, said stop means being positioned to form a locking connection between said housing member and said channel means.

7. The apparatus of claim 1, wherein said run-off table extends substantially vertically, and said cutting tool is positioned below said run-off table.

8. The apparatus of claim 1, wherein said feed-in table comprises first and second spaced apart sections, said apparatus further comprising intermeshing knife roller means positioned with their axis extending perpendicularly to the infeed direction of said material to be granulated in the space between said first and second sections, whereby said knife roller means cuts said material into longitudinal strands.

9. The apparatus according to claim 1, wherein said two rollers are positively driven and wherein the position of said guide means for said conveyor belt is adjustable for adjusting the tension of said conveyor belt.

* * * * *

UNITED STATES PATENT OFFICE
CERTIFICATE OF CORRECTION

Patent No. 3,837,586        Dated September 24, 1974

Inventor(s) Otto Perschbacher et al

It is certified that error appears in the above-identified patent and that said Letters Patent are hereby corrected as shown below:

[30]     Foreign Application Priority Data

Dec. 6, 1971     Germany                    2160456

Signed and sealed this 31st day of December 1974.

(SEAL)
Attest:

McCOY M. GIBSON JR.                C. MARSHALL DANN
Attesting Officer                  Commissioner of Patents